Jan. 31, 1956

G. C. WILSON 2,733,383

ELECTRONIC DELAY TIMER

Filed April 1, 1952

2 Sheets-Sheet 1

INVENTOR.
George C. Wilson

BY
Robert S. Dunham

ATTORNEY

Jan. 31, 1956

G. C. WILSON 2,733,383

ELECTRONIC DELAY TIMER

Filed April 1, 1952

2 Sheets-Sheet 2

INVENTOR.
George C. Wilson
BY
Robert S. Dunham
ATTORNEY 2,733,383

ELECTRONIC DELAY TIMER

George C. Wilson, Chatham, N. J.

Application April 1, 1952, Serial No. 279,866
14 Claims. (Cl. 315—183)

This invention relates to electronic time delay apparatus, and more particularly to an electronic delay timer which is responsive to an applied electrical signal or voltage, for effecting a desired circuit controlling operation after a predetermined time of delay. It will be understood that the applied signal may be represented simply by a contact closure or opening in an appropriate control circuit or indeed in part of the timer circuit itself.

A primary object of the invention is to provide a novel and improved device of the character stated, which may be embodied in a compact, self-contained unit and which affords superior accuracy and reliability of response with substantial independence of varying conditions, e. g. with respect to the voltage of the applied signal or with respect to temperature, line frequency or other circumstances of use.

A further object of the invention is to provide an electronic time delay device having improved reliability or uniformity of operating characteristics, essentially unaffected by change in the specific characteristics of the output tube employed, a corollary object being to provide an improved device of the stated character having its electronic and other elements, designed or arranged (for example in some cases so that variation in characteristics of one component cancels variation of another) to avoid or minimize change of ultimate response, with age or ambient conditions.

Another specific object is to afford an electrical delay apparatus of a type dependent on delay of a charging current by a high resistance, wherein provision is made to avoid or minimize shunting effects on the resistance, i. e. effects which might alter the delay time of the apparatus. Other objects are to provide apparatus of the character stated: wherein the entire device, including its electronic components, may be wholly energized by the applied electrical signal alone yet with superior accuracy of results; wherein simple and improved means are provided for minimizing effect of variation in the applied signal voltage, upon the desired delay time of the device; wherein the device may be instantaneously available for response, without warm-up time or the like; wherein instantaneous, full reset may be obtained; wherein the time of delay may, if desired, be controlled (e. g. reduced) according to the promptness with which re-use of the timer follows a previous resetting operation; and wherein the entire apparatus may be housed in a sealed, air-tight unit of light weight and unusually small size. An additional object is to afford apparatus which may be operable, in a fully reliable and effective manner, on input signals of either direct or alternating current.

A still further object is to provide electronic timing means of a multiple character, e. g. such as to afford, with a single, compact combination of instrumentalities, a response to any of a plurality of times of delay, as in situations where emergency response is desired upon failure of occurrence of any one of a timed sequence of operations.

To these and other ends, including such further objects and advantages as are hereinbelow apparent or are incidental to the disclosed apparatus, certain presently preferred embodiments of the invention are described below and shown in the accompanying drawings, by way of example to illustrate the features and principles of improvement.

Referring to the drawings.

Figure 1:
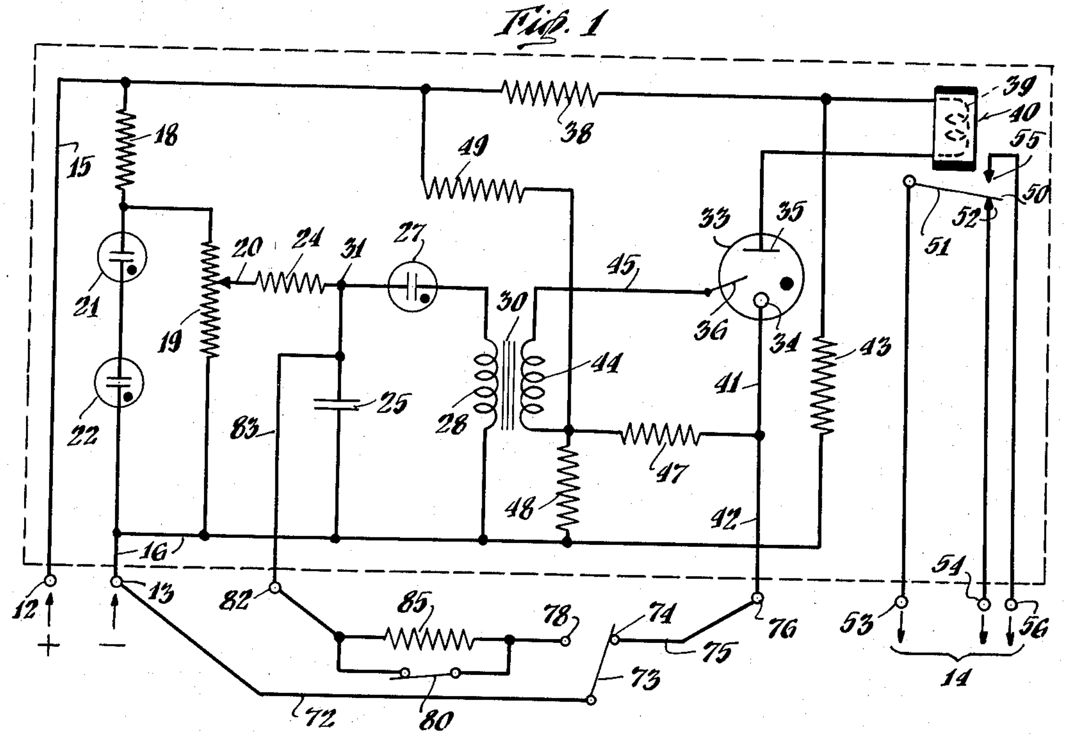
Fig. 1 is a wiring diagram of a timer embodying the invention.
Figure 2:
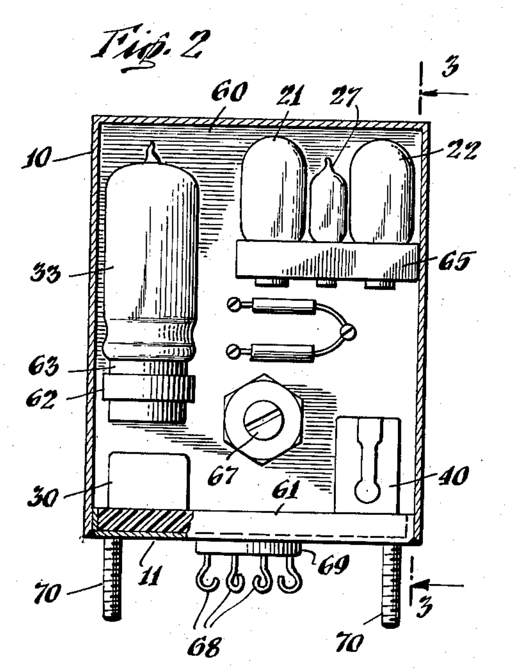
Fig. 2 is an elevational view, with the housing structure partly in vertical section, of the timer of Fig. 1.
Figure 3:
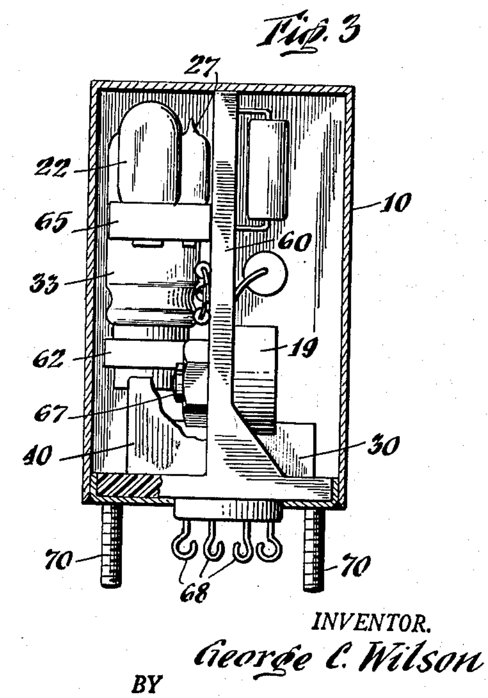
Fig. 3 is a vertical section on line 3—3 of Fig. 2, with certain parts further broken away.

As indicated above, the improved time delay device such as shown in Fig. 1, is preferably embodied in a small, compact unit of the sort illustrated in Figs. 2 and 3, for example being essentially entirely contained in a housing which comprises a rectangular sheet metal box 10 having an open bottom, and a similarly metallic base portion 11 which is secured in the bottom of the box 10 and there sealed by solder or the like, in the manner shown. With components of the sort mentioned below by way of example, the described housing structure may be relatively small, for instance having a vertical dimension of 3 to 3½ inches and horizontal dimensions of about 2 by 2½ inches or slightly more. In some cases the improved apparatus or circuit may be embodied in other ways, or included as a part of larger equipment or systems, but the compact and self-contained nature of the illustrated device is a special feature of improvement, to which the preferred circuit arrangement materially contributes.

Before further describing the elements as structurally shown in Figs. 2 and 3, reference may first be made to the wiring diagram of Fig. 1, where 12 and 13 represent input terminals to receive an electrical signal for which a predetermined, delayed response is desired, e. g. in the control of a circuit or circuits connected to the output terminals generally designated 14. Although the device may be designed to respond to various electrical signals or may be adapted to low voltage signals as by the provision of preliminary inversion, transformation and rectification, to afford a stepped-up input, the illustrated circuit is conveniently arranged for response to signal voltages of the order of 100 or more, particularly where it is desired to employ the applied signal as anode supply for certain electronic means in the device, rather than to use a separate power supply.

The input terminals 12 and 13, in this case being assumed to receive a direct current signal, are connected by leads 15 and 16 to the ends of a voltage dividing network which comprises a fixed resistance 18 and the total resistance 19 of a potentiometer device having an adjustable tap or contact 20. The input network also preferably includes electronic voltage regulating means such as the pair of series-connected neon tubes 21, 22 which are connected in parallel with the potentiometer resistance 19, and thus, like the latter, in series with the other resistance 18 across the input lines 15, 16. Thus upon reception of an electrical signal having a voltage higher than the total firing and operating voltage of the regulating means (which may be one or more regulator tubes such as the two tubes 21, 22) a predetermined, regulated voltage is established across the resistance 19, of which a desired fraction appears between the tap 20 and the input line 16. To establish the desired delay, the last-mentioned voltage is applied to a circuit consisting of a resistor 24 and a capacitor 25 connected in series between the tap 20 and the line 16, the resistor 24 having a conveniently high value and thus affording delay in the charging of the condenser 25, i. e. in that the flow of charging current to the condenser is appropriately reduced by the resistance 24.

Electronic means are provided for response to the arrival of the charge on the condenser 25 at a predetermined voltage, such means conveniently including a gas-type electronic device such as the two-electrode neon tube 27 which, in series with the primary 28 of a step-up transformer 30, is connected across the condenser 25, i. e. between the line 16 and the other condenser terminal indicated at 31. For most effective actuation of appropriate circuit controlling instrumentalities, the apparatus includes further electronic means responsive to firing of the neon tube 27, such further means including a tube of multiple electrode type, i. e. having a control electrode and arranged to effect appropriate energization of an output circuit, as governed by the delayed signal on the control electrode. To particular advantage, the further electronic device in Fig. 1 consists of a single gas tube 33 of the cold-cathode type, specifically a triode having a cathode 34, anode 35 and control electrode 36. The tube 33, which requires no separately energized filament or heater for its cathode 34, is arranged for energization of its anode circuit from the input signal, such circuit extending from the input line 15 through a resistor 38 and the winding 39 of a suitable electromagnetic relay 40 to the anode 35, and from the cathode 34 through conductors 41 and 42 back to the other input terminal 13 through a direct connection that is more specifically described below. The resistor 38 and a further resistance 43 connected in series with it across the input terminals 12, 13, constitute a voltage divider which may be optionally employed to limit the anode voltage on the tube 33, i. e. in cases where the input signal voltage may be so high as to be excessive for the particular tube selected or particularly for insurance against firing of the tube 33 except as controlled by the electrode 36; in some cases, it will be understood, the upper lead of the relay winding 39 may be directly connected to the input line 15 and both resistors 38 and 43 omitted, if no voltage limitation is necessary.

The control signal to be derived from the firing of the neon tube 27 and applied to the electrode 36, conveniently consists of a voltage pulse developed across the secondary 44 of the transformer 30 and an added or supplemental voltage derived as an appropriate fraction of the input signal. Thus the control circuit for the tube 33 (when the timer is to operate) extends from the control electrode 36, through conductor 45, transformer secondary 44 and resistor 48, back to input line 16 and its terminal 13, and thence (by virtue of the connection mentioned above between the cathode line 42 and the terminal 13) back to the cathode 34 via the conductors 42 and 41. A supplemental resistor 47 is also connected directly between the lower end of the transformer secondary 44 and the cathode line 41; in the illustrated circuit the resistor 47 serves to insure the difference in potential between the starter electrode 36 and the cathode 34 does not exceed a limiting value prior to operation of the timer. Thus during times when the cathode line 42 is disconnected from the terminal 13, the limiting function of the resistance 47 prevents inverse breakdown in the tube 33. The function of the resistor 48 in actual operation of the timer (the resistor 47 being then in parallel with it and modifying its value accordingly) arises from its connection with a further resistance 49 across the input lines 15, 16, the arrangement thus constituting a voltage divider which thus applies, across the resistance 47—48, a predetermined fraction of the input voltage, in the control electrode circuit.

Although other controlled circuit arrangements may be used in some cases, the anode or output circuit of Fig. 1 is conveniently of normally deenergized type, so that the relay 40 is energized only upon conduction of the tube 33. The relay may be of approximately electromagnetic type, arranged to provide any of a variety of circuit controlling functions, e. g. to open or close any one or more circuits in accordance with its condition and relation to a number of movable and fixed contacts provided to be actuated by the relay. Simply by way of example, the device of Fig. 1 includes a movable contact 50 operated by the relay armature 51 and normally closed against a fixed contact 52 so as to close a circuit which may extend to the output terminals 53, 54. Upon energization of the relay, the contact 50 is shifted to open the circuit just mentioned and to engage another fixed contact 55, thus closing a circuit which would extend to the output terminals 53, 56, the terminals 53, 54 and 56 thus constituting the set above generally identified as 14.

Assuming, as stated above, that the cathode conductor 42 is connected to the input terminal 13 (such connection being in some cases, if desired, permanently effected in the complete device), the operation of the circuit of Fig. 1 is as follows: When there is no signal voltage applied to terminals 12 and 13, which are assumed to be connected to an appropriate signal or other controlling circuit (not shown), all of the tubes are non-conductive and the relay 40 is deenergized. Upon application of a signal voltage to the input terminals, say a voltage in the range of 200 to 300 volts D. C. (the terminal 12 being made positive), a corresponding voltage thus appears across the input network consisting of the devices 18, 19, 21 and 22. The tubes 21 and 22 fire at once, thus establishing a predetermined voltage across the potentiometer resistor 19, such voltage being of selected value dependent on the selected characteristics of the last-mentioned tubes and independent of considerable variation of the applied signal. Depending on the adjustment of the tap 20, a predetermined voltage is applied to the delay circuit 24—25, and current flows to charge the condenser 25. When the voltage across the condenser reaches a value essentially equivalent to the firing voltage of the tube 27, i. e. a voltage necessary to render the tube conductive in the circuit shown, the tube 27 fires, initiating current flow in the transformer primary 28.

Thus the tube 27 becomes conductive (reaching its steady state value of voltage and current essentially at once) and continues to conduct, but only until the charge on the condenser 25 drops below the operating voltage of the tube 27. Since the value of the resistor 24 is so high that it cannot pass enough current to keep the tube 27 ionized, the tube deionizes upon the described drop of condenser charge (thus virtually opening the circuit of the transformer primary 28), and remains non-conductive until the condenser recharges. During the brief interval that the tube 27 is conducting, its internal resistance is of the order of magnitude of the transformer primary 28. Therefore the total voltage supplied by the condenser 25 is divided between the tube 27 and transformer primary 28. The time required for discharge of the condenser is very short, so that the voltage appearing across the primary 28 is in the nature of a voltage pulse of short duration.

In consequence of the firing (i. e. conduction) of the tube 27, the effect of the pulse in the transformer primary circuit is to produce a corresponding voltage pulse in the secondary 44, preferably of an amplified voltage relative to the corresponding drop across the primary 28, the transformer being suitably connected, as will now be readily understood, so that the pulse across the secondary is positive at the conductor 45 extending to the control electrode 36. Although a certain positive voltage has already been applied to the control electrode circuit, across the parallel resistors 47, 48, the value of these and the other component 49 of the corresponding voltage divider has been selected so that this previously and still applied voltage is of itself insufficient to cause conduction of the tube 33, but the circuit parameters are so selected that the total voltage of the pulse across the transformer secondary and the supplemental bias is enough to fire the cold cathode tube. In consequence the production of the pulse by the firing of the tube 27 renders the tube 33 conductive, energizing the relay 39 in its output circuit and effecting corresponding circuit controlling action with respect to the terminals 14, as desired. Since the tube 33, once rendered conductive, will remain so independently of subsequent fall of its control electrode voltage, the relay 40 remains thereafter energized, so long as a signal appears across the input terminals 12 and 13. Upon subsequent disappearance of the input signal, voltage supply to all of the tubes is interrupted and the relay 40 is deenergized, all of the tubes being now non-conducting and the circuit functioning to restore itself for a repeated, time delay operation. It will be noted that all operations of the circuit are essentially instantaneous when triggered, except for the firing of the control tube 27, which is retarded to afford the precise time of delay desired, such time being dependent on the delay in reaching the necessary voltage across the condenser 25, and being thus more specifically dependent upon the actual voltage applied between the tap 20 and conductor 16, and the time constant of the circuit consisting of the resistance 24 and the capacitor.

Referring now particularly to Figs. 2 and 3, it will be seen that essentially all of the components of the circuit of Fig. 1 may be readily incorporated within the compact, sealed housing 10—11. The actual arrangement of the parts in the housing or in any other space or structure is in many respects a matter of choice, although certain physical relationships are of particular advantage, especially for attainment of certain special results with the circuit of Fig. 1. A convenient structure for the apparatus thus represents a plastic or similar upright plate 60 rising integrally from a plastic or other similar insulating plate 61 seated and retained in the base 11, the major components being conveniently carried on the upright plate 60. Thus an appropriate shelf 62 projecting from one face of the plate 60 at one side carries a socket 63 for receiving the cold cathode tube 33. A further shelf 65, conveniently projecting from the same face of the plate 60, carries all three of the neon tubes 21, 22 and 27, the arrangement of these tubes being very advantageously such that the tube 27 is illuminated, as much as possible, by the tubes 21, 22. Thus the delayed-firing tube 27 is conveniently disposed so that it is wholly or partly (as shown) between the other tubes, close to them and thus receiving light from them. At suitable other localities on the plates 60 and 61, the various other elements of the circuit are conveniently mounted, including the various resistors (which are indicated without reference number in Figs. 2 and 3, for clarity) the transformer 30 and relay 40 (diagrammatically indicated) and likewise the potentiometer resistor 19 having a tap adjusted by the screw 67, which is accessible when the assembly is removed from the housing. Various terminals (such as indicated at 12, 13 and 14 in Fig. 1) may be provided as by the lugs 68 projecting from an insulating button 69 which is sealed in the base 11. Appropriate mounting means, such as the threaded studs 70 on the base may also be provided.

Referring also to Fig. 1, certain special advantages of the timer may now be specifically mentioned. As intimated, the input network including the simple neon-tube regulating means 21, 22 establishes an accurately constant voltage across the potentiometer 19, so that the delay in reaching the predetermined voltage across condenser 25 for conduction of the tube 27 is accurately and reliably set by the adjustment of the tap 20. In consequence, the delay time is independent of considerable variation of the input signal voltage, e. g. being thus pre-set to be constant at any desired value as from a fraction of a second to a plurality of seconds or longer. Furthermore, although selection of the delay time can be had by making the resistance 24 adjustable or by careful calibration of this element (indeed a highly accurate resistor 24 and timing condenser 25 may be preferable in some embodiments of the circuit), the arrangement of the adjustable potentiometer 19–20 is desirable in many cases to avoid the expense of an accurately calibrated resistor 24 and also to minimize other difficulties. That is to say, the resistor 24, to provide a suitable time constant, is of relatively high value and if accessible to moisture and the like, would be susceptible of proportionately large change by reason of such atmospheric or other condition. When it is difficult to keep moisture away from an adjustable resistance, the present circuit permits the fixed resistor 24 to be of completely sealed construction, whereas the adjustable resistor 19–20, although perhaps exposed to moisture (should the seal of the housing be disturbed), is of relatively low value and thus is not changed proportionately very much in resistance by the effect of moisture. Furthermore, the regulating means 21, 22 tend to maintain the voltage across the resistor 19 at the desired value regardless of any changes in its over-all resistance, so that the fractional voltage achieved by the tap 20 is correspondingly unchanged. As will thus be seen, the device is very readily adjusted or calibrated at the outset, to an accurately predetermined time of delay regardless of the fact that the components (including the various resistors and the condenser 25) may be of inexpensive, commercial type having large tolerances. All that is necessary is to make successive applications of a test signal to the input, and adjust the tap 20 until the delay time is of the value desired.

While in some cases an appropriately very sensitive electromagnetic relay or the like may be substituted, in effect, for the tube 33 (such relay having its winding connected in lieu of primary 28 and having suitable lock-in means), the inclusion of the tube 27 for direct response to the condenser 25 is extremely desirable in all cases. The tube 27 effectively serves to avoid effects of changing response characteristics in the means controlled by it, and thus in the circuit shown, avoids variations which might occur by change in characteristics of the tube 33 during its life. For instance cold cathode devices of this type are usually such that as the tube ages, the firing voltage on the starter or control electrode 36 rises considerably, indeed to the extent that when the tube is old, from 25% to 50% higher voltage may be needed to effect firing than in the case of a new tube. The firing voltage of two-electrode gas tubes such as the neon tube 27, if pre-aged, remains reasonably constant over a long time; hence by the arrangement shown, constancy of response is afforded with the tube 27, with appropriate control of the power or relay tube 33 by virtue of the coupling connection (including the transformer 30) which utilizes the conducting pulse of the tube 27 for control of the electrode 36. Here the supplemental voltage included in the control or starter electrode circuit, by reason of the divider 49, 47–48, is sufficient so that when the pulse is added to it, conduction of the tube 33 will result at any time throughout the life of the latter tube, the supplemental voltage being nevertheless insufficient to fire the tube 33 even when it is new.

It may be noted, in passing, that the voltage preset between the tap 20 and the input line 16 may be conveniently larger than the actual voltage required between the terminal 31 and line 16 for conduction of the tube 27; that is to say, the time of delay is determined by the time taken for the capacitor 25 to reach such firing voltage, at which the condenser discharges before it can charge further toward the higher voltage available at the tap 20. The availability of this excess voltage further facilitates the preliminary adjustment of the device, without regard to accurate calibration of the individual components. A large excess voltage may also be of advantage if in some special design of the timer it is desired that the tube 27 remain conductive until the input signal disappears; however, it is contemplated that usually the arrangement will be such (indeed as specifically described herein) that the neon tube 27 is rapidly extinguished (and then starts its own cycle anew, e. g. in the manner of a relaxation oscillator) by large voltage drop which appears across the resistor 24 each time the tube 27 fires.

For actual operation the conductor 42 from the cathode of the tube 33 is connected directly to the input line 16, the latter line comprising a common return for various elements as shown and being grounded if desired. While this connection may in some cases be permanently effected in the device, it is here shown (Fig. 1) as comprising a conductor 72 extending from the terminal 13 to a single-pole double-throw switch 73 and thence via contact 74 of the switch and conductor 75 to the terminal 76 to which the conductor 42 is connected. The switch 73 is provided so that if desired a prompt and complete discharge of the condenser 25 can be attained for rapid, full re-set after the relay has functioned, the circuit for the latter purpose extending through conductor 72, switch 73, the other contact 78 of the switch 73, normally closed switch 80, terminal 82 and conductor 83 to the other or upper side of the capacitor 25. Furthermore, displacement of the switch 73 away from the contact 74 breaks the direct connection between cathode 34 and the line 16 and reduces the voltage between anode and cathode of tube 33 sufficiently to interrupt operation of the tube and deenergize relay 39 (e. g. if the supply circuit to terminals 12, 13 has not been interrupted). Thus in use, the switch 73 is normally maintained with its arm closed against the contact 74; after each functioning of the apparatus as a relay, the switch can be rapidly shifted to the contact 78 and then immediately or when the timer is to be re-used the switch is moved back to the contact 74, with assurance that in all such cases the timer is reset for full-delay response to a new signal at the terminals 12, 13.

In some cases it may be desirable to reduce the delay time of the system below its normal period. For example, the timer may be used in association with electronic equipment wherein a warm-up time is required for the thermionic tubes to prevent their being damaged by premature application of high voltage or load. In such use, the switch 73 may be ganged with the heater current switch (not shown) of the electronic equipment (not shown) and the contacts 50—55 may be used to control the high voltage in the latter; the timer supply voltage is connected continuously to the terminals 12, 13. Thus when the electronic equipment is turned off, the switch 73 is simultaneously turned to contact 78. When the electronic equipment is to be re-started, re-energization of its heaters is accompanied by replacement of the switch 73 on contact 74, and after the predetermined delay in the device of Fig. 1, relay 39 is energized and contacts 50—55 close to apply high voltage to the equipment. Sometimes re-use of the electronic equipment may be needed quite soon after it has been turned off, and in such case (its tubes being still at least partially warmed up), only a shorter warm-up is needed. A resistor 85 connected between the terminal 82 and the switch point 78 in the timer control circuit can then be effective to reduce the delay period of the timer, it being assumed that the switch 80 is then open or omitted. In such case the resistance 85 delays discharge of the condenser 25, so that it may not be fully discharged if the switch 73 is rather promptly moved back to contact 74 to reinitiate the timer cycle; consequently, a shorter time is then required to charge the condenser 25 to firing voltage of neon tube 27, and the delay produced by the timer (for energization of relay 39) is reduced, e. g. in practical effect, more or less in proportion to the reduction in warm-up period needed for the electronic equipment. It will be understood that this supplemental control (with resistor 85) of the delay period of the timer under conditions of rapid re-use, may be availed of for other purposes than in the control of electronic equipment using thermionic tubes.

It will be noted that in normal operation the resistors 47 and 48, which afford the supplemental voltage in the starter electrode circuit of the tube 33, are connected in parallel, the drop across them being then determined by their effective resistance in such parallel connection. At the same time, by reason of the illustrated arrangement of these resistors, the cathode 34 is maintained substantially more positive with respect to the line 16, when the switch 73 is opened relative to the switch point 74, thus reducing the total effective voltage between anode and cathode of the tube 33, i. e. by an amount equal to the drop across resistor 48 alone. While this special arrangement (e. g. including the supplemental resistor 47) is not necessary in all cases, it provides a further factor of safety against undesired operation under certain conditions.

With the understanding that the various values of circuit components may vary with requirements and that a variety of types of tubes and other devices may be employed as desired, the following is one example of a particular apparatus wherein effective results were obtained for response to an input signal of about 275 volts D. C. at the terminals 12, 13. The tube 33 was a cold cathode triode, specifically of the type designated as RCA No. 5823, the neon bulb 27 being of the type designated as GE No. NE–2 and the tubes 21, 22 being similarly neon bulbs of the type designated GE No. NE–7. With resistor 18 having a value of 100,000 ohms and potentiometer 19 a total value of 250,000 ohms, the voltage across the latter was found to be stabilized by the tubes 21, 22 at about 130 volts. The tube 27 is adapted to fire at a predetermined voltage, which is about 65 volts, its drop at once falling to about 50 volts, and the circuit being thereafter in effect opened when the tube 27 deionizes. This operation produces the effect of a momentary voltage pulse across the transformer primary 28, of about 15 volts, and produces an amplified pulse in the control electrode circuit of the tube 33. The step-up ratio of the transformer is 3:1 (although other ratios, particularly higher ratios may also be conveniently used), so that a single pulse of about 45 volts results in the secondary, the connection of the transformer being such that the positive, 45 volt peak of the pulse, is applied to the starter electrode 36. The resistors 49 and 48 were each 110,000 ohms and the resistor 47 was 51,000 ohms, with the result that when terminal 76 is grounded, i. e. connected directly to the line 16, the supplementary voltage in the control electrode circuit is between 60 and 65 volts. The voltage required on the starter electrode 36 of the tube 33, for firing the tube varies from about 70 volts when the tube is new, to an aged value of about 105 volts, so that the sum of the pulse and supplemental voltages is always enough to fire the tube, but the supplemental voltage itself is insufficient. The voltage dividing network 38, 43 was conveniently proportioned to apply about 190 volts to the anode 35. In one instance, the condenser 25 was a fixed condenser of 0.1 mfd. and the resistor 24 had a value of 8.2 megohms; in such case a delay time of about ½ to 3 seconds was obtainable, depending on the adjustment of the tap 20. It will be understood that by appropriate other values of the resistor 24 and condenser 25, any of a very wide range of delay times may be achieved, from extremely small fractions of a second up to many seconds or longer.

The apparatus has been found to function with unusual reliability, in affording relay operation with accurate fidelity of delay time as pre-set. Where embodied in a sealed compact unit of the sort shown in Figs. 2 and 3, the device is applicable to a wide variety of uses, its lightness of weight and self-contained nature making it particularly suitable for control or indicating purposes in aircraft or the like. As indicated above, the neon tubes 21, 22 are preferably disposed so as to afford illumination on the control neon tube 27. Because of some slight photoelectric characteristics of tubes of this type and because the original adjustment of the device is conveniently made with the cover 10 removed (whereas in use the cover 10 keeps the apparatus in darkness) such illumination of the tube 27 promotes its uniformity of response, particularly its constancy of firing voltage. It will also be noted that since in the preferred circuit, none of the tubes is of a heated cathode type, none of them is adapted to generate much heat and consequently a fully sealed, closely fitting enclosure may be employed without danger of derangement due to heating effects. Furthermore, as will be apparent, the entire apparatus in its preferred form is energized from the supplied signal, nor is any warm-up period necessary, e. g. with the cold cathode tube 33. Nevertheless, as indicated above, other electronic or similar devices, including pulse-responsive electronic relays using vacuum tubes, transistors or the like may sometimes be used in place of the tube 33, or alternatively a heated cathode tube, e. g. a thyratron.

Figure 4:
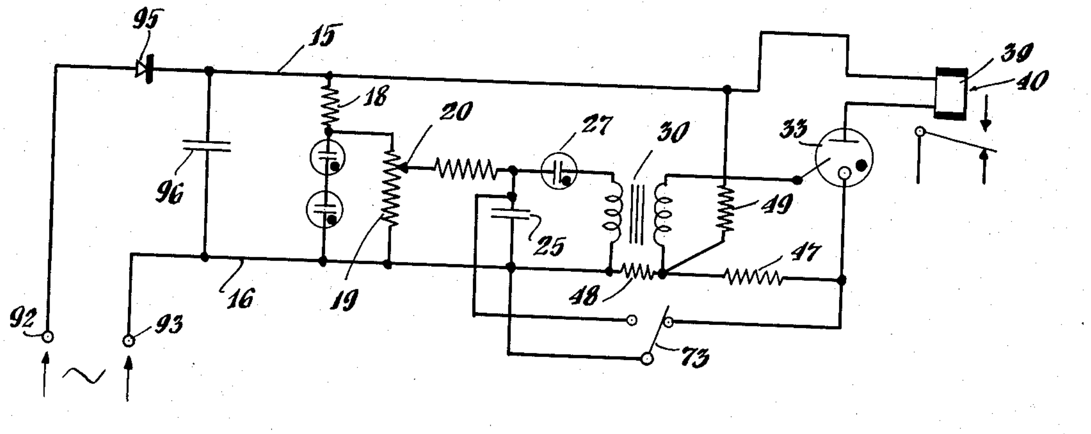
Fig. 4 is a wiring diagram of a modified form of the timing device.

Fig. 4 shows a modified circuit, particularly as arranged for response to an input signal of alternating current. In general, the circuit is the same as in Fig. 1, except that the voltage divider in the anode supply to the tube 33 has been omitted for clarity or simplification, other parts being numbered the same as in Fig. 1. Here the signal input circuit includes appropriate rectifying means, preferably with some filtering or smoothing means, so as to convert the alternating current signal received at the terminals 92, 93, to a direct current signal between the conductors 15 and 16. Although other rectifying and filtering means may be employed, a simple and promptly responsive arrangement comprises the rectifier 95 connected between the terminal 92 and the conductor 15, such rectifier being a crystal diode, selenium rectifier, vacuum or gas tube. In the output of the rectifier, i. e. across the lines 15, 16, a smoothing condenser 96 is connected, having a preferably substantial capacity, for example from 1 to 4 mfd. depending on the frequency at the A. C. input terminals 92, 93. Thus upon inception of an A. C. signal of appropriate voltage, a corresponding D. C. signal is promptly established at the lines 15, 16, for the desired delayed operation of the relay 40, i. e. after time of delay is determined and achieved in the manner explained above relative to Fig. 1.

Figure 5:
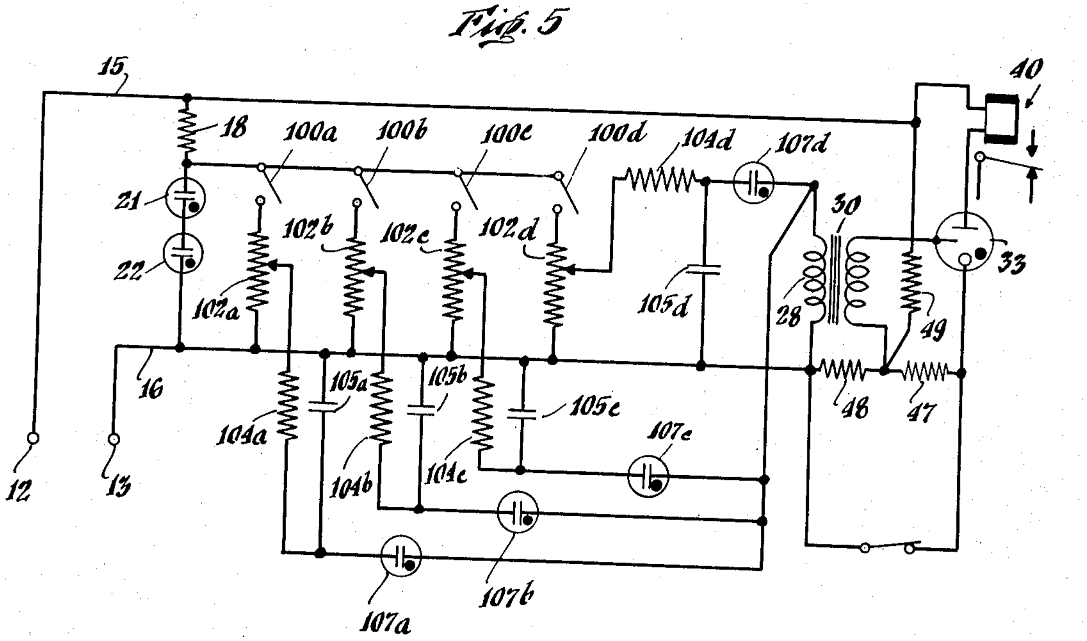
Fig. 5 is a wiring diagram of a further modification.

The apparatus of Fig. 5 similarly employs the same basic circuit as in Fig. 1, but here includes a plurality of selectively effective delay circuits, each affording a different delay time for response to the tube 33 and relay 40. Here the regulated voltage across the regulating means 21, 22 is delivered through any selected, closed one of a plurality of switches 100*a* to 100*d* inclusive to appear across a correspondingly selected one of the potentiometer resistors 102*a* to 102*d* inclusive. Connected to individually adjustable voltage taps on these resistors, are a plurality of time delay circuits having their outputs connected in parallel to the primary 28 of the transformer 30, the circuits each consisting of a resistor, condenser and neon tube connected in the same manner as the resistor 24, condenser 25 and tube 27 of Fig. 1. As noted, the resistors are separately identified as 104*a* to 104*d* inclusive, the condensers as 105*a* to 105*d* inclusive, and the neon tubes as 107*a* to 107*d* inclusive. It will be understood that although four selectable delay circuits are shown, a greater or less number of the same may be included, in accordance with requirements. Although the system of Fig. 5 may be useful, as implied, for rapidly selecting any one of a plurality of different preset delay times, to which the relay is to respond, the system is also of special use as a safety device in connection with apparatus where a timed sequence of operations must be performed (e. g. by independent control) and where a special closing-down or like emergency operation is needed should any one of the sequential steps fail. For example, suppose that by other means a particular sequence of four events is to be performed. The several delay circuits corresponding to the switches 100*a* to 100 *d* are pre-set for delays of successively longer time corresponding to slightly more, in each case, than the time from starting which is required for each operation. The switches 100*a* to 100*d* are all closed at the time when the series of operations is to be initiated, and may be arranged to be individually open (either by automatic or manual means) as the corresponding operation is actually performed. In consequence, if each operation is performed within its prescribed time, all of the switches will be opened (in succession) before their delay times have expired and thus without any operation of the relay 40. On the other hand if any one of the sequence of operations is not performed within its own time, the corresponding one of the neon tubes 107*a* to 107*d* will fire, triggering the tube 33, and operating the relay 40 to effect the desired emergency function. In this manner, such emergency function can be made to occur upon any single failure in a sequence of timed operations, i. e. regardless of which of the operations has failed. For the described and similar purposes, the apparatus of Fig. 5 is notably convenient and effective and represents an economy of structure and parts, in that single relay tube 33 and associated instrumentalities, as well as a single relay 40, suffices for the ultimate control in accordance with any one of a plurality of different times of delay.

It will now be seen that the apparatus of the present invention affords a novel and effective electronic timing arrangement, which is adaptable to a wide variety of uses and which may be accurately responsive to a suitable signal, i. e. with a selected delay time. Although as explained, other electronic means including vacuum tube devices with appropriate lock-in circuits or the like may be used in some cases, the employment of a cold cathode tube 33 for response to the pulse from the neon tube delay circuit, such tube being conveniently energized by the control signal itself, contributes materially to the convenience and simplicity of the device. The circuit is readily susceptible of embodiment in a small, self-contained unit, lending itself to ready incorporation in any of a variety of electrical control or indicating systems. It is to be understood that the invention is not limited to the specific embodiments herein shown or described but may be carried out in other ways without departure from its spirit.

I claim:

1. Electrical time delay apparatus comprising, in combination, capacitor means, input circuit means including resistance means connected to said capacitor means for charging said capacitor means to a predetermined voltage only upon predetermined delay after inception of an electrical signal in said input means, a two-electrode gas tube connected to said capacitor means and adapted to become conductive only upon attainment of said predetermined voltage, a cold-cathode gas tube having a control electrode and having an anode, a cathode, and an output circuit extending to said anode and cathode and arranged to be normally non-conductive, and transformer means coupling said control electrode with said first tube to render the last-mentioned gas tube conductive upon conduction of the first tube.

2. Electrical time delay apparatus comprising, in combination, capacitor means, input circuit means including resistance means connected to said capacitor means, for charging said capacitor means to a predetermined voltage only upon predetermined delay after inception of an electrical signal in said input means, a two-electrode neon tube connected to said capacitor means and adapted to become conductive only upon attainment of said predetermined voltage, a cold-cathode, gas tube having a control electrode and connected to be normally non-conductive, and transformer means coupling said control electrode with said neon tube to render the cold-cathode tube conductive upon conduction of the neon tube.

3. Electrical time delay apparatus comprising, in combination, capacitor means, input circuit means including resistance means connected to said capacitor means for charging said capacitor means to a predetermined voltage only upon predetermined delay after inception of an electrical signal in said input means, a two-electrode gas tube connected to said capacitor means and adapted to become conductive only upon attainment of said predetermined voltage, a cold-cathode, gas tube having a control electrode and connected to be normally non-conductive, said control electrode being arranged to effect conduction of said cold-cathode tube in response to a predetermined electrical pulse, and means coupling said first tube with said control electrode for applying said predetermined pulse to the control electrode upon conduction of said first tube, said coupling means comprising a transformer intermediate the first tube and the control electrode, for delivering an electrical pulse to said control electrode in response to initiation of conduction in said first tube, said control electrode being connected in a control circuit which is connected to said transformer and which includes means connected with said input circuit for introducing a supplemental voltage in said control circuit in series with said pulse, said pulse and supplemental voltage being each alone insufficient but together sufficient to bias said control electrode for effecting such conduction of said cold-cathode tube.

4. In electrical time delay apparatus, in combination, an input circuit including voltage-dividing resistance means having an adjustable tap providing a correspondingly adjustable voltage output, capacitor means and resistance means for delaying charging of said capacitor means, connected in series across said adjustable output, voltage regulating tube means connected in parallel with at least a portion of said first-mentioned resistance means which provides a higher voltage than said adjustable tap, to afford proportional regulation of the aforesaid voltage output, a normally non-conductive two-electrode gas tube directly coupled to said capacitor means to receive firing voltage therefrom and adapted to become conductive only upon attainment of a predetermined voltage across said capacitor means, a cold-cathode tube having a cathode, an anode and a control electrode, step-up transformer means connected in series with said two-electrode tube and directly coupled to said control electrode for delivering a stepped-up voltage pulse between said control electrode and cathode to fire the cold-cathode tube upon conduction of said two-electrode tube, said cold-cathode tube having a normally non-conductive anode circuit extending between the anode and cathode and connected with the input circuit for energization by a received electrical signal when the cold-cathode tube is rendered conductive, said anode circuit maintaining conduction through the cold-cathode tube so long as said signal persists after firing of the cold-cathode tube by the aforesaid pulse.

5. Apparatus as described in claim 4, which is enclosed in a housing and wherein said voltage regulating tube means comprises neon tube means and said two-electrode tube comprises a neon tube, said first-mentioned neon tube means being disposed close to said second-mentioned neon tube for illumination thereof.

6. In electrical time delay apparatus, in combination, an input circuit including voltage-dividing resistance means having an adjustable tap providing a correspondingly adjustable voltage output, capacitor means and resistance means for delaying charging of said capacitor means, said last-mentioned resistance means being a fixed resistor sealed against moisture and having a high resistance value relative to the voltage-dividing resistance, connected in series across said adjustable output, a two-electrode gas tube connected to said capacitor means to receive energizing voltage therefrom and adapted to become conductive only upon attainment of a predetermined voltage across said capacitor means, a cold-cathode, gas tube having a control electrode and connected to be normally non-conductive, said cold-cathode tube having an anode and a cathode and an anode circuit connected between said anode and cathode and energized when said cold-cathode tube becomes conductive, and transformer means coupling said control electrode with said two electrode tube to render the cold-cathode tube conductive upon conduction of the two-electrode tube.

7. In electrical time delay apparatus, in combination, capacitor means having resistance means in series therewith for predetermined delay of charging of said capacitor means to a predetermined voltage, input circuit means adapted to receive a continuing electrical signal of a voltage higher than said predetermined voltage, said input circuit means including means for applying charging voltage to said capacitor means through the resistance means, normally non-conductive, cold-cathode gas tube means having a control electrode and having an anode circuit connected with said input circuit means for energization by the received electrical signal when the tube means is rendered conductive, and means including a two-electrode gas tube and a transformer having its primary connected in series with said two-electrode tube across the capacitor means, for coupling the control electrode with the capacitor means to effect conduction of the electron tube means upon attainment of said predetermined voltage across the capacitor means, said means for applying charging voltage from the input circuit comprising resistance means and voltage-regulating tube means connected in series across the input circuit for establishing a predetermined voltage across the said regulating tube means, and adjustable voltage-dividing resistance means connected across said regulating tube means and having an adjustable output connected to said capacitor and charg-delaying resistance means, said output of the voltage-dividing means having a range of adjustability up to a voltage higher than the aforesaid predetermined voltage, said charge-delaying resistance means being a fixed resistor sealed against moisture and having a high resistance value relative to the voltage-dividing resistance means.

8. In electrical time delay apparatus, in combination, an input circuit including means for establishing a predetermined voltage in response to a received electrical signal, normally non-conductive gas tube means having a control electrode and an anode circuit and responsive to a predetermined electrical pulse on said control electrode for effecting conduction in said anode circuit, coupling means adapted for connection to a normally non-conductive, control-tube circuit for delivering the aforesaid pulse to said control electrode, a plurality of delay circuit means each comprising voltage-dividing resistance means having an adjustable output tap, a resistor and capacitor connected in series across said adjustable output for charging the capacitor after a delay determined by the setting of said tap, and a normally non-conductive two-electrode gas tube connected to the capacitor and adapted to conduct upon attainment upon a predetermined voltage across the capacitor, all of said two-electrode tubes being connected with said coupling means and all of said delay circuit means having a corresponding plurality of circuit controlling means respectively associated with the voltage-dividing means thereof, for selectively connecting each and all of said voltage-dividing means with the means establishing a predetermined voltage in the input circuit, said first-mentioned gas tube means being a cold-cathode tube having an anode circuit connected to the input circuit for energization by the received electrical signal and said coupling means comprising a transformer intermediate the several two-electrode tube means and the control electrode of the cold-cathode tube.

9. Apparatus as defined in claim 8: wherein the means in the input circuit for establishing a predetermined voltage includes voltage-regulating tube means for maintaining said voltage at predetermined value.

10. Electrical time delay apparatus comprising, in combination, capacitor means, an input circuit means extending to said capacitor means and including means resisting flow of current to said capacitor means, for charging said capacitor means to a predetermined voltage only upon a predetermined delay after inception of an electrical signal in said input means, a two-electrode gas tube directly coupled to said capacitor means to receive firing voltage therefrom and adapted to become conductive only upon attainment of said predetermined voltage, a cold-cathode gas tube having a control electrode, an anode and a cathode, an output circuit extending between said anode and said cathode and arranged to be normally non-conductive, and transformer means coupling said control electrode with said first tube to render the cold-cathode tube conductive upon conduction of the first tube, for effecting current flow in said output circuit.

11. Electrical time delay apparatus comprising capacitor means, resistor means in series therewith for delaying charging of said capacitor means to a predetermined voltage, input circuit means adapted to receive a continuing electrical signal, for applying to said series-connected capacitor and resistance means a voltage at least as high as said predetermined voltage, a normally non-conductive two-electrode gas tube directly coupled to said capacitor means to receive firing voltage therefrom and adapted to become conductive only upon attainment of said predetermined voltage across said capacitor means, relay means coupled to said two-electrode tube and operable in response to conduction of said two-electrode tube, said input circuit means comprising means for establishing a control voltage in accordance with the received electrical signal, and means coupled to said voltage establishing means for applying voltage as aforesaid across the capacitor and resistance means, and voltage-regulating gas tube means connected across said voltage-establishing means and rendered conductive by said electrical signal, for maintaining constancy of the voltage applied to the series-connected capacitor and resistance means, said voltage-regulating tube means being disposed to illuminate the aforesaid two-electrode tube and said apparatus including means enclosing said two-electrode tube and said voltage-regulating tube means against access of external light.

12. Apparatus as described in claim 11, wherein the relay means comprises a cold-cathode, gas tube having a control electrode, an anode, a cathode and an anode circuit, said anode circuit extending between the anode and cathode and being connected with the input circuit to be energized by the aforesaid electrical signal when said cold-cathode tube is rendered conductive, and transformer means coupling said control electrode to said two-electrode tube for rendering the cold-cathode tube conductive in response to conduction of said two-electrode tube, said electrical time delay apparatus including a sealed, air-tight housing closely surrounding the same and enclosing all of the aforesaid means and tubes thereof.

13. Electrical time delay apparatus comprising, in combination, capacitor means, an input circuit means extending to said capacitor means and including means resisting flow of current to said capacitor means, for charging said capacitor means to a predetermined voltage only upon a predetermined delay after inception of an electrical signal in said input means, a two-electrode gas tube directly coupled to said capacitor means to receive firing voltage therefrom and adapted to become conductive only upon attainment of said predetermined voltage, a cold-cathode gas tube having a control electrode, an anode and a cathode, an output circuit extending between said anode and said cathode and arranged to be normally non-conductive, said output circuit being connected with the aforesaid input circuit means for energization by the received electrical signal when the cold-cathode tube is rendered conductive, and step-up transformer means coupling said control electrode with said first tube, for delivering a stepped-up voltage pulse between said control electrode and said cathode, to render said cold-cathode tube conductive, in response to conduction of said first tube.

14. A compact electrical time delay unit for performing a circuit-controlling operation in predetermined delayed response to an applied electrical signal and receiving electrical energization solely from said signal, comprising, in combination, capacitor means, resistance means in series therewith for delaying charge of said condenser to a predetermined voltage, input circuit means adapted to receive the applied signal and coupled to said series-connected capacitor and resistance means for applying charging current thereto from said signal, a normally non-conductive two-electrode gas tube directly coupled to said capacitor means to receive firing voltage therefrom and adapted to become conductive only upon attainment of said predetermined voltage across said capacitor means, electronic means having an anode and cathode spaced to provide a path for electronic conduction, said electronic means having a control element and being of normally unheated deenergized type adapted for instantaneous establishment of electrical conduction in said path upon application of predetermined voltage to said control element, step-up transformer means coupling said electronic means to said two-electrode tube for delivering said predetermined voltage to said control element upon conduction of said two-electrode tube, an output circuit extending between said anode and cathode and connected to said input circuit means for energization from the received signal for effectuating said conduction in the electronic means when said control element receives said voltage, and a sealed, air-tight housing closely surrounding and enclosing all of the aforesaid instrumentalities constituting the time delay unit.

References Cited in the file of this patent

UNITED STATES PATENTS

| | | |
|---|---|---|
| 1,499,078 | Schroter | June 24, 1924 |
| 1,901,663 | Minkler | Mar. 14, 1933 |
| 2,086,614 | Grandstaff | July 13, 1937 |
| 2,088,495 | Swedelund | July 28, 1937 |
| 2,320,916 | Dawson | June 1, 1943 |
| 2,394,891 | Bowie | Feb. 12, 1946 |
| 2,404,001 | Smith | July 16, 1946 |
| 2,406,853 | Richardson et al. | Sept. 3, 1946 |
| 2,422,020 | Kingsmill | June 10, 1947 |
| 2,492,749 | Hills | Dec. 27, 1949 |
| 2,504,908 | Tryon | Apr. 18, 1950 |
| 2,567,928 | Farmer | Sept. 18, 1951 |